US006426747B1

(12) United States Patent
Hoppe et al.

(10) Patent No.: US 6,426,747 B1
(45) Date of Patent: Jul. 30, 2002

(54) OPTIMIZATION OF MESH LOCALITY FOR TRANSPARENT VERTEX CACHING

(75) Inventors: Hugues Hoppe, Redmond; John W. Miller, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/326,349

(22) Filed: Jun. 4, 1999

(51) Int. Cl.⁷ .............................................. G06T 17/00
(52) U.S. Cl. ....................................................... 345/419
(58) Field of Search ................................ 345/418, 419, 345/420, 421, 441

(56) References Cited

U.S. PATENT DOCUMENTS

| | | | | |
|---|---|---|---|---|
| 5,768,156 A | * | 6/1998 | Tautges et al. .............. | 364/578 |
| 6,009,435 A | * | 12/1999 | Taubin et al. ................ | 345/420 |
| 6,016,153 A | * | 6/2000 | Gueziec et al. .............. | 345/441 |
| 6,208,347 B1 | * | 3/2001 | Migdal et al. ............... | 345/419 |

OTHER PUBLICATIONS

Bar–Yehuda, R., et al., "Time/Space Tradeoffs for Polygon Mesh Rendering," *ACM Transactions on Graphics*, 15, 2 (Apr. 1996), pp. 141–152.

Chow, M.M., "Optimized Geometry Compression for Real–time Rendering," *Visualization '97 Proceedings*, (1997), IEEE, pp. 347–354.

Deering, M., "Geometry Compression," *Computer Graphics (SIGGRAPH '95 Proceedings)* (1995), pp. 13–20.

Evans, F., et al., "Optimizing Triangle Strips for Fast Rendering," *Visualization '96 Proceedings* (1996), IEEE, pp. 319–326.

Gumhold, S., et al. "Real Time Compression of Triangle Mesh Connectivity," *Computer Graphics (SIGGRAPH '98 Proceedings)* (1998), pp. 133–140.

Hakura, Z.S., et al., "The Design and Analysis of a Cache Architecture for Texture Mapping," *Proceedings of the 24th International Symposium on Computer Architecture* (Jun. 1997), pp. 108–120.

Hoppe, H., "Efficient Implementation of Progressive Meshes," *Computers and Graphics 22*, 1 (1998), pp. 27–36.

Lengyel, J.E., "Compression of Time–Dependent Geometry," *Symposium on Interactive 3D Graphics* (1999), pp. 89–95.

Li, J., et al., "Progressive Compression of 3D Graphic Models," *Multimedia Computing and Systems* (Apr. 1997), IEEE, pp. 135–142.

Woo, M., et al., "OpenGL Programming Guide", Second Edition, Addison–Wesley Developers Press, 1993.

(List continued on next page.)

*Primary Examiner*—Cliff N Vo
(74) *Attorney, Agent, or Firm*—Woodcock Washburn LLP

(57) ABSTRACT

Methods for vertex caching to decrease geometry bandwidth and to reduce bus traffic between a graphics subsystem and memory include a strip-growing technique and a local optimization technique. The strip-growing technique determines an ordering of the faces in memory for the purpose of maximizing the use of the cache. This technique minimizes the number of vertices that are retrieved from a vertex buffer, and maximizes the number of needed vertices that are obtained from a vertex cache. The local optimization technique improves the results of the strip-growing technique by exploring a set of perturbations to the face ordering. The order is perturbed semi-randomly to determine if the perturbation improves the caching behavior. Types of perturbations include reflection and insertion. Thus, data is preprocessed to optimize the use of the cache stored data so that when the data is rendered at a future time, the rendering speed is improved.

25 Claims, 10 Drawing Sheets

OTHER PUBLICATIONS

Rasmussen, E., "Clustering Algorithms," *Information Retrieval, Data Structures and Algorithms* (1992), W. Frakes and R. Baeza–Yates, Edition, Prentice Hall, pp. 419–442.

Taubin, G., et al., "Progressive Forest Split Compression," *Computer Graphics* (*SIGGRAPH '98 Proceedings*) (1998), pp. 123–132.

Taubin, G., et al., "Geometric Compression Through Topological Surgery," *ACM Transactions on Graphics 17*, 2 (Apr. 1998), pp. 84–115.

Touma, C., et al., "Triangle Mesh Compression," *Proceedings of Graphics Interface '98* (1998).

* cited by examiner

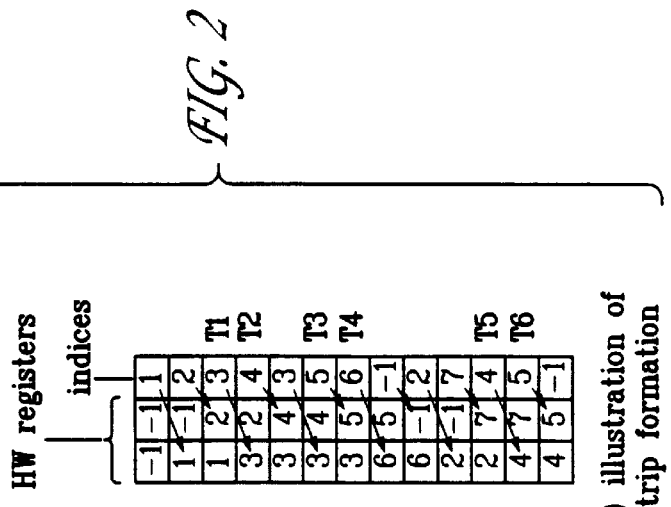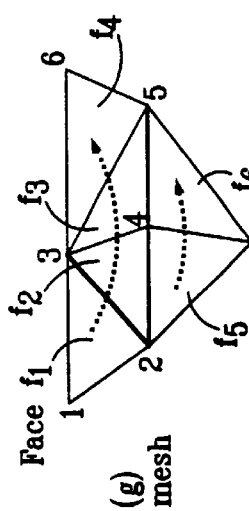
FIG. 2

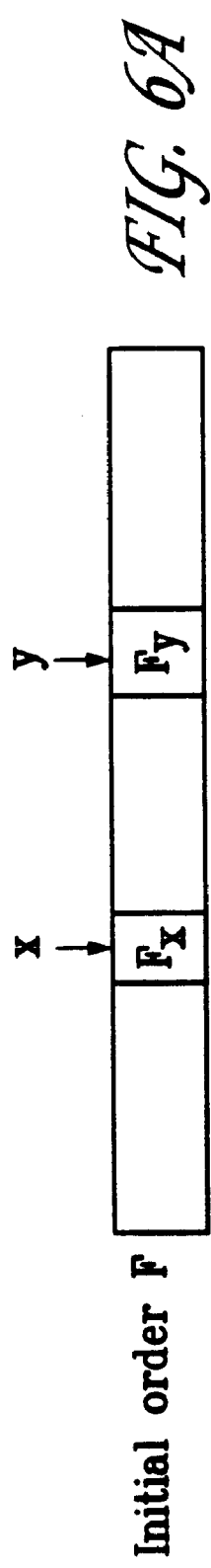
FIG. 6A — Initial order F
FIG. 6B — F'=Reflect$_{x,y}$(F)
FIG. 6C — F'=Insert1$_{x,y}$(F)
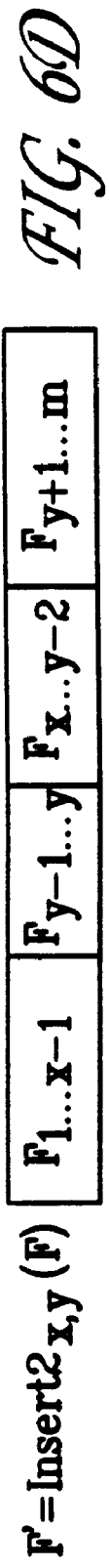
FIG. 6D — F'=Insert2$_{x,y}$(F)

OPTIMIZATION OF MESH LOCALITY FOR TRANSPARENT VERTEX CACHING

FIELD OF THE INVENTION

This invention relates generally to geometric modeling using polygonal meshes for computer graphics, and more particularly relates to systems in which the connectivity of the mesh, but not the geometry, is fixed. Still more particularly, the present invention relates to methods for vertex caching to decrease geometry bandwidth and to reduce bus traffic between a graphics subsystem and memory.

BACKGROUND OF THE INVENTION

Graphics performance in low-end computer systems has recently experienced significant growth due to the integration of 3D graphics functions into custom graphics processors. The graphics subsystem now shares many similarities with the central processing unit (CPU). Both consist of a massively integrated processing unit, a local memory cache, and a bus to main memory. Reducing the von Neumann bottleneck between the CPU and main memory has been a fundamental problem in computer architecture. The graphics subsystem now experiences a similar bottleneck.

In the traditional polygon-rendering pipeline, the graphics processor accesses two types of information from memory: (1) a model geometry and (2) raster images (e.g., texture map, bump map, environment map) used in shading this geometry. The problem of reducing texture image bandwidth is described in Hakura and Gupta, *The Design And Analysis Of A Cache Architecture For Texture Mapping*, Proceedings of the 24th International Symposium on Computer Architecture (June 1997), 108–120.

Models in computer graphics are often represented using triangle meshes. FIG. 1(*a*) is a diagram of portions of example triangle meshes. Geometrically, a triangle mesh (e.g., example portion of a triangle mesh 80) is a piecewise linear surface consisting of triangular faces joined together along their edges. The vertices of a triangle mesh (e.g., vertices 82–89 of the mesh 80 of FIG. 1(*a*)) are denoted as $v_1, \ldots, v_m$; the edges (e.g., 92–95) are denoted by pairs of adjacent vertices as $e=\{v_j, v_k\}$; and the faces (e.g., faces 100–107) are denoted by triples of interconnected vertices as $f=\{v_j, v_k, v_l\}$. Typically, a model is converted into a triangle mesh using conventional triangulation processes (e.g., edges are added to subdivide polygonal faces of the mesh having more than three sides into triangle faces).

More particularly, the model geometry is usually described as a mesh of triangle faces sharing a common set of vertices, as shown in, for example, FIG. 1(*b*). On average, each mesh vertex is shared by six adjacent triangles. Vertex data, which may include position, normal, colors, and texture coordinates, uses on the order of 32 bytes, so it is desirable to minimize the number of times this data must be read from memory. One common technique for reducing the geometry bandwidth (by a factor of almost three) is to organize faces into triangle strips, so that two vertices are re-used between successive faces as described in Evans et al., *Optimizing Triangle Strips For Fast Rendering*, Visualization '96 Proceedings (1996), IEEE, 319–326, and Neider et al., *OpenGL Programming Guide*, Addison-Wesley (1993). Implementing such triangle strips uses a set of three vertex registers in the graphics processor.

The use of a larger vertex register set has the potential to further reduce geometry bandwidth by another factor of nearly two. The key is to reorder the faces within the triangle mesh to maximize references to vertices already loaded in registers. Such an approach is described in Deering, *Geometry Compression*, Computer Graphics (SIGGRAPH '95 Proceedings) (1995), 13–20, and further described in Chow, *Optimized Geometry Compression For Real-Time Rendering*, Visualization '97 Proceedings (1997), IEEE, 347–354. In Deering and Chow, the vertex data is quantized and delta-encoded into a compressed geometry stream. This geometry stream includes "push bits" to explicitly specify which vertices should be loaded into a first-in-first-out (FIFO) vertex buffer. Deering and Chow report compression rates of 3 to 8 bytes per triangle.

Various memory organizations have been used for representing triangle meshes. The memory organizations are described below, letting n denote the number of vertices in the mesh, and m denote the number of triangle faces. Often, the approximation m≈2n is used. Vertex data is assumed to use 32 bytes (three words for position, three words for normal, and two words for texture coordinates). Vertex data may be more compact if the normal or texture coordinates are omitted. However, to support multi-texturing, several graphics application programming interfaces (APIs) now allow specification of multiple texture coordinates per vertex, so vertex data may also be larger. Some of the representations refer to vertices through indices; each index is assumed to occupy two bytes. Although this constrains the maximum mesh size to approximately 128 K faces, more complex models are commonly represented as collections of smaller, independent meshes. The mesh representations are illustrated in FIGS. 2(*a*)–2(*e*) with respect to an exemplary mesh shown in FIG. 2(*g*). FIG. 2(*f*) shows an exemplary strip formation using triangle strips, and a summary of the analysis appears in Table 1 in which b represents a strip "bloat" factor, described below.

TABLE 1

Memory and transfer requirements for various organizations of meshes

| Mesh Organization | Memory Size (bytes) | Transfer Size (bytes) |
| --- | --- | --- |
| Independent Triangles | 96 m | 96 m |
| Triangle Strips | 32 bm | 32 bm |
| Indexed Triangles | ≈22 m | 102 m |
| Indexed Triangle Strips | ≈(16 + 2 b)m | 34 bm |

In independent triangles, as shown in FIG. 2(*a*), the mesh is organized as an array of m faces, each containing data for its three face vertices, for a total of m·3·32≈96 m bytes. Although this organization is seldom used in memory, many graphics drivers convert other representations such as indexed triangles into such a stream when sending the data to the graphics system.

In triangle strips, the mesh faces are organized into sequences of contiguous faces called strips, as shown for example in FIGS. 2(*b*) and 2(*f*). The first face in the strip is specified by three vertices, and each subsequent face uses one additional vertex. Some interfaces (e.g., IRIS GL) allow explicit control over the direction of strip formation in generalized triangle strips. More recent memory-based representations define sequential triangle strips, in which the direction of strip formation alternates left/right, as described in Neider et al. The default strip direction can be overriden by duplicating a vertex in the data stream, for instance vertex 3 in FIGS. 2(*b*), 2(*d*), and 2(*f*). The overall size of the representation is 32 bm bytes, where b is a strip "bloat" factor to account for the costs of restarting strips and overriding strip direction. Typically, strip bloat factor is in the range between about 1.1<b<1.5. A review of several techniques for generating good triangle strips, that is, minimizing b, is described in Evans et al. and in Xiang et al., *Fast And Effective Stripification Of Polygonal Surface Models*, Symposium on Interactive 3D Graphics (1999), ACM, 71–78.

In indexed triangles, as shown in FIG. 2(c), the mesh is organized as an array of vertices, and an array of faces where each face refers to its three vertices through indices. The memory representation has size n·3+m·3·2≈22 m bytes. Although this representation is more concise than triangle strips, the graphics processor must read more data from memory, a total of m·3·(2+32)=102 m bytes.

In indexed triangle strips, as shown in FIG. 2(d), again, the mesh consists of a vertex array and faces that refer to vertices through indices, but here the faces are organized into strips. A special vertex index, denoted −1, forces a strip restart. Alternatively, a strip can be restarted by duplicating two indices, as shown in the lower right corner of FIG. 2(d). Memory use is n·32+m·b·2≈(16+2b)m bytes, and transfer size is 34 bm bytes.

In edge-based representations, programs commonly use more general pointer-based data structures (e.g., wingededge, half-edge, and quad-edge) to allow traversal and topological modification on meshes. However, because many applications may find these operations unnecessary, it is preferable to use a simpler, leaner representation for the API.

The compression of triangle meshes has recently been an active area of research. An exemplary compressed instruction stream is shown in FIG. 2(e). Taubin and Rossignac record trees over both the graph and the dual graph of a mesh to compress connectivity to 1 to 2 bits per triangle, and use a linear predictor to compress vertex data to 5 to 10 bytes per triangle, as described in *Geometric Compression Through Topological Surgery*, ACM Transactions On Graphics, 17, 2 (April 1998), 84–115. Gumhold and Strasser present a fast scheme for encoding mesh connectivity in approximately two bits per triangle in *Real Time Compression Of Triangle Mesh Connectivity*, Computer Graphics (SIGGRAPH '98 Proceedings) (1998), 133–140. Touma and Gotsman, *Triangle Mesh Compression*, Proceedings Of Graphics Interface '98 (1998), encode mesh connectivity by recording the number of neighbors for each vertex, and use a "parallelogram rule" for predicting vertex positions. Hoppe, *Efficient Implementation Of Progressive Meshes*, Computers and Graphics, 22, 1 (1998), 27–36; Li et al., *Progressive Compression Of 3D Graphics Models*, Multimedia Computing And Systems (April 1997), IEEE, 135–142; and Taubin et al., *Progressive Forest Split Compression*, Computer Graphics (SIGGRRAPH '98 Proceedings) (1998), 123–132, describe compressed representations that permit progressive transmission of meshes.

While all of these schemes provide significant gains over traditional mesh representations, their decompression algorithms involve data structures that do not easily map onto a graphics processor. Therefore, they are most appropriate for transmission and archival purposes only. Another limitation is that these schemes currently consider only static geometry, and it would be infeasible to recompress animated geometry changing at every frame.

Bar-Yehuda and Gotsman, *Time/Space Tradeoffs For Polygon Mesh Rendering*, ACM Transactions On Graphics, 15, 2 (April 1996), 141–152, investigate the use of a vertex stack in reducing the data sent to the graphics system. They show that a stack of size θ√n is both necessary and sufficient to render an arbitrary mesh without sending vertices multiple times.

Deering designs a compression scheme specifically aimed at hardware implementation. The scheme uses a 16-entry FIFO vertex buffer. The mesh is represented as a stream of variable-length instructions that load vertices into the buffer and use buffer entries to form generalized triangle strips. Vertex data is quantized and delta-encoded to exploit coherence between neighboring vertices. Chow describes several enhancements to this approach, including a meshification algorithm and an adaptive quantization technique. As with other compressed stream representations, the scheme is limited to static geometries. Other limitations of Deering and Chow include: (1) the graphics system reads a linear stream of vertex data and instructions (vertex data may appear multiple times if it is re-used after being dropped from the cache); (2) vertex data is compressed through quantization and delta-encoding; (3) the API is a special streaming format; (4) the geometry must be static, because (a) duplicated vertices would require additional bookkeeping, (b) delta-encoding prevents random access and modification, and (c) frame-rate re-compression would be infeasible; and (5) explicit bits manage allocation within the vertex buffer.

Accordingly, there is a need for improved vertex caching methods and systems for decreasing bus traffic between a graphics system and a separate memory containing the vertices of the faces of the meshes that represent a model.

SUMMARY OF THE INVENTION

The present invention is directed to systems and methods for vertex caching to transparently reduce geometry bandwidth by two reordering techniques: a strip-growing method and a local optimization method. The strip-growing method determines an ordering of the faces in memory, for the purpose of maximizing the use of the cache. This technique minimizes the number of vertices that are retrieved from the vertex buffer, and maximizes the number of needed vertices that are obtained from the vertex cache. To further insure that the maximum number of needed vertices are obtained from the vertex cache, a first-in, first-out (FIFO) cache replacement policy is used.

A second reordering technique, referred to as a local optimization method, improves the results of the strip-growing method by exploring a set of perturbations to the face ordering. The order is perturbed semi-randomly to determine if it improves the caching behavior at all. Types of perturbations include reflection and insertion. Thus, the invention preprocesses data to optimize the use of the cache stored data so that when the data gets rendered at a future time, the rendering speed is improved.

The foregoing and other aspects of the present invention will become apparent from the following detailed description of the invention when considered in conjunction with the accompanying drawings.

BRIEF DESCRIPTION OF THE DRAWINGS

FIGS. 2(a)–2(e) show exemplary mesh representations with respect to an exemplary mesh structure shown in FIG. 2(g).

FIG. 2(f) shows an exemplary strip formation using triangle strips of the mesh of FIG. 2(g).

FIG. 2(g) is an exemplary mesh structure.

FIG. 6(a) shows an exemplary face ordering, and FIGS. 6(b)–6(d) show perturbations to the initial face ordering of FIG. 6(a) in accordance with the present invention (6(a) shows an initial order, 6(b) shows subsequence reflection in which two faces are flipped or swapped, 6(c) shows insertion of one face in which one face is moved from the back to the front, and 6(d) shows a pair of faces are moved from the back to the front).

DETAILED DESCRIPTION OF THE ILLUSTRATED EMBODIMENTS

Overview

The present invention is directed to systems and methods for vertex caching to transparently reduce geometry bandwidth. Use of an indexed triangle strip representation permits application programs to animate the meshes at video rates, and provides backward compatibility on legacy hardware.

The efficiency of vertex caching is maximized by reordering the faces in the mesh during a preprocess. The present invention is directed to two reordering techniques: a strip-growing method and a local optimization method. The strip-growing method performs look-ahead simulations of the cache to adapt strip lengths to the cache capacity to reorder the faces. In other words, the strip-growing method performs look-ahead simulations of the rendering process to determine an ordering of the faces in memory, for the purpose of maximizing the use of the cache. The current face has three neighboring faces; one of these is presumably the face just previously visited by the triangle strip. Of the remaining two neighboring faces, there may be 0, 1, or 2 unvisited faces; i.e., faces that have not yet been incorporated into a strip. If there are no unvisited faces, the strip is restarted. If there is one unvisited face, the strip continues to that face. If there are two unvisited faces, the strip preferably continues in a counter-clockwise order to the next face. This technique minimizes the number of vertices that are retrieved from the vertex buffer, and maximizes the number of needed vertices that are obtained from the vertex cache. To further insure that the maximum number of needed vertices is obtained from the vertex cache, a first-in, first-out (FIFO) cache replacement policy is used.

Figure 5:
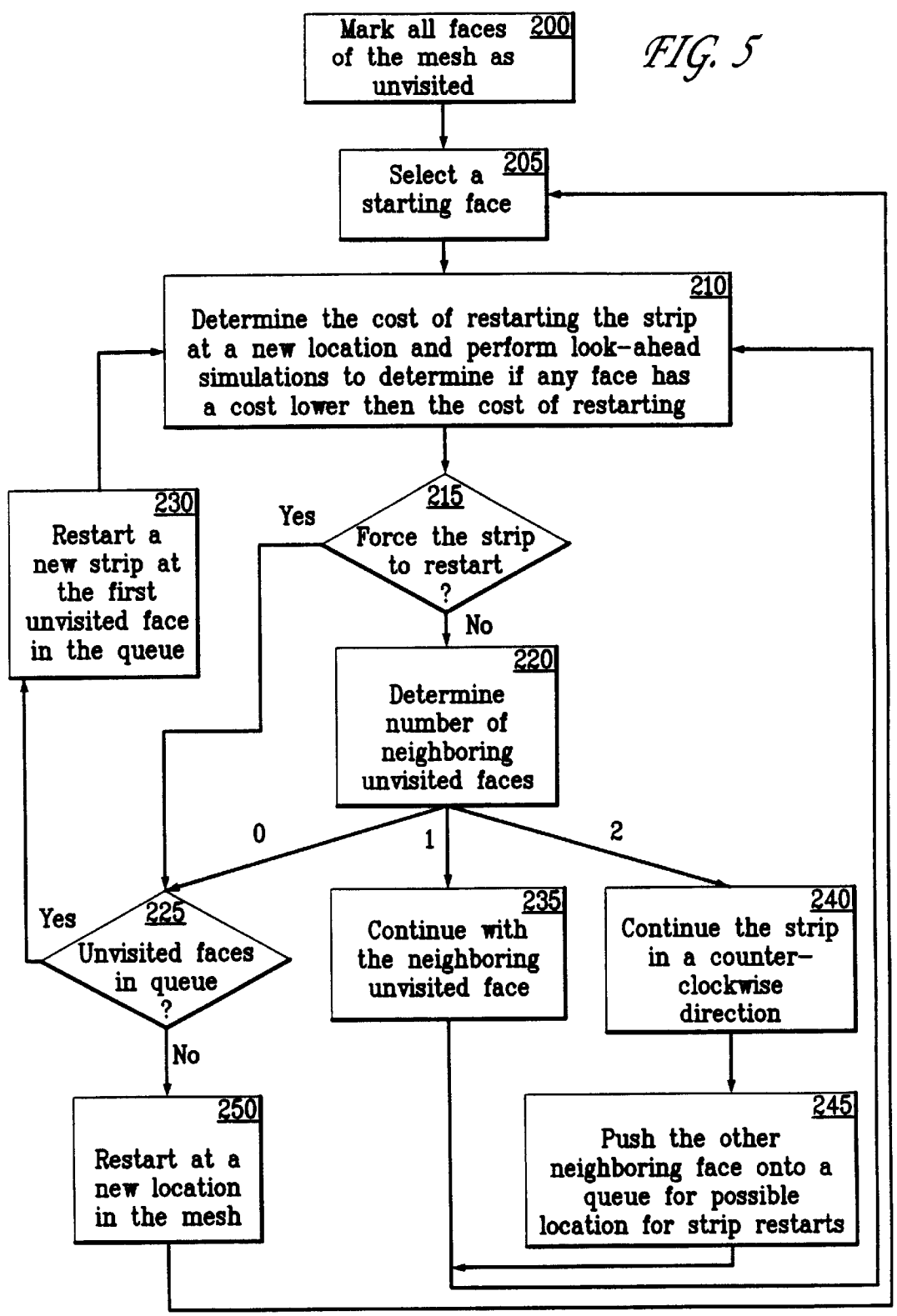
FIG. 5 is a flow chart of an exemplary strip-growing method in accordance with the present invention.

The look-ahead simulation determines the cost C of restarting the strip at a new location and determines if any face has a lower cost than the cost of restarting, as described below with respect to FIG. 5. If it is determined that a face has a lower cost than the cost of restarting, then the face is formed. If no face has a lower cost than the cost of restarting, the strip is restarted at a new location.

As an optimization method, the first face found in the look-ahead simulation that has a cost lower than the restart cost is formed. In this manner, all of the possible faces do not always have to be determined in the look-ahead simulation.

The second reordering technique, referred to as local optimization, improves the results of the strip-growing method by exploring a set of perturbations to the face ordering. The order is perturbed semi-randomly to determine if it improves the caching behavior at all. Types of perturbations include reflection and insertion (e.g., faces are swapped; one face is moved from the back to the front; and a pair of faces is moved from the back to the front). Thus, the invention preprocesses data to optimize the use of the cache stored data so that when the data is rendered at a future time, the rendering speed is improved.

Figure 1A:
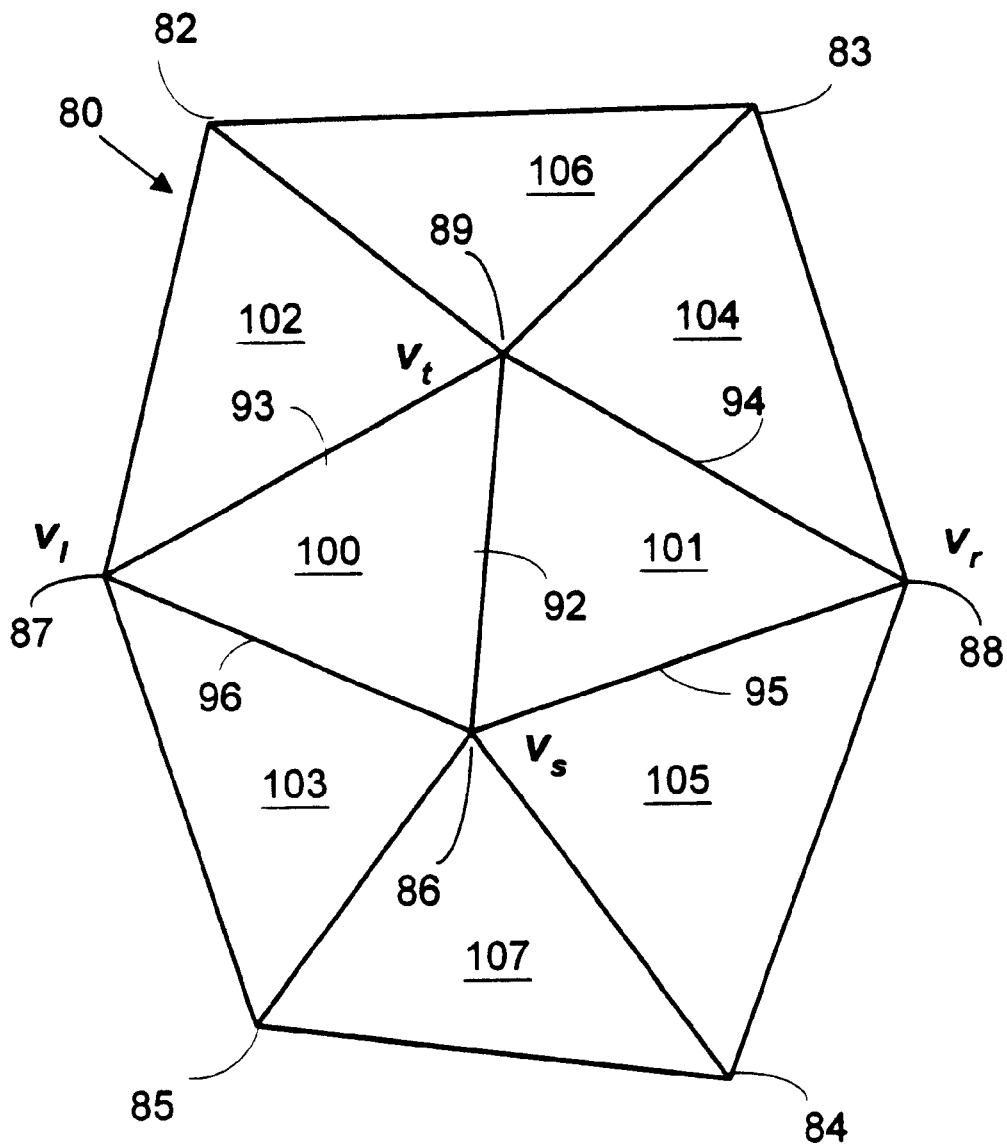
FIG. 1(a) is a diagram of portions of example triangle meshes.
Figure 3:
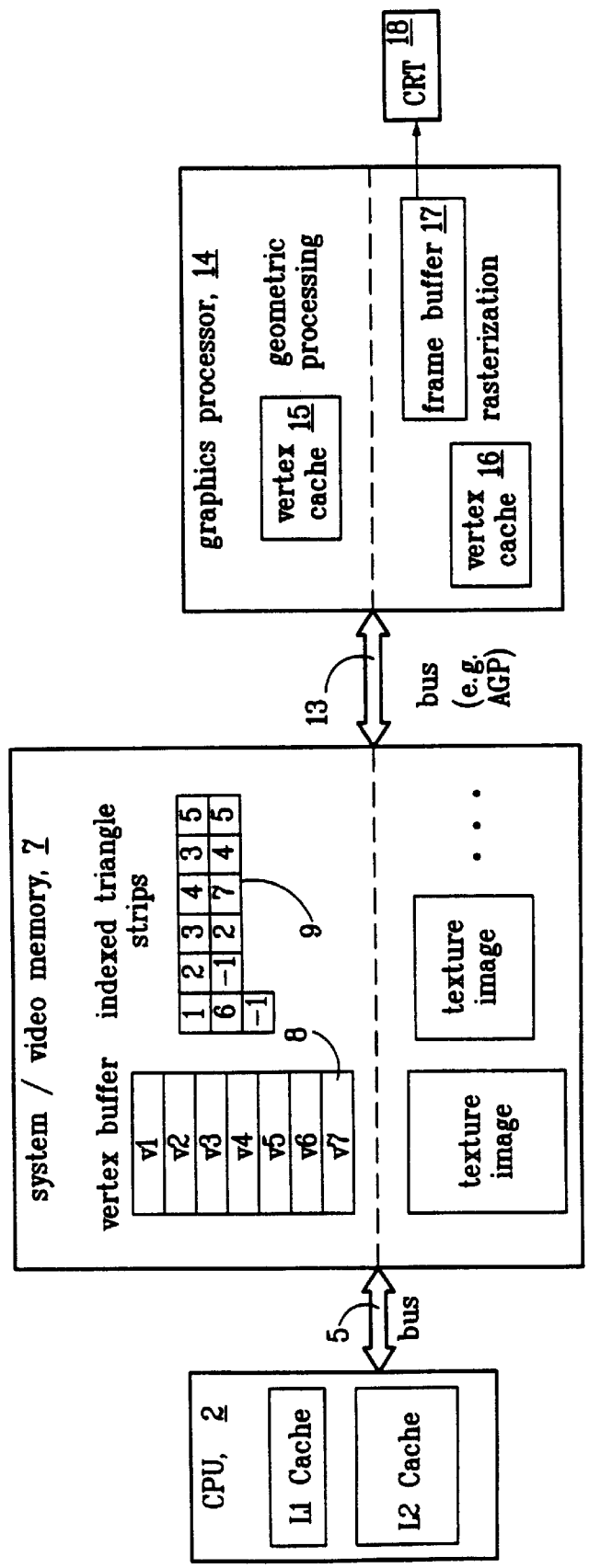
FIG. 3 is a block diagram of an exemplary system in accordance with the present invention.

A block diagram of an exemplary system architecture to which the invention is directed is shown in FIG. 3. A CPU 2 is connected by a bus 5 to a system/video memory 7. The system / video memory 7 is connected by bus 13 to a graphics processor 14. The graphics processor 14 includes a vertex cache 15, a texture cache 16, and a frame buffer 17. The frame buffer 17 is coupled to a display, such as a CRT 18. The present invention is adapted for use in an interactive computer graphics system in which geometric objects are represented by a mesh structure (as shown, for example, in FIG. 1). The mesh structure is made up of vertices that define triangular faces of the mesh. In such a system, the connectivity of the vertices is fixed whereas the geometry of the mesh structure (the 3D coordinates of the vertices) is not fixed. The vertex coordinates are stored in system (or video) memory 7 in a vertex buffer 8 along with index data 9 defining the order in which the vertices are rendered by a graphics processor. The vertex buffer 8 is a data array of the vertices (i.e., the 3D coordinates of the respective vertices). This arrangement is designed to enhance the speed at which objects can be rendered, because speed is of prime importance in an interactive system. To further enhance rendering speed, the graphics processor 14 includes a cache 15 for storing a subset of the vertex data during rendering.

The bus 13 between the system/video memory 7 and the graphics processor 14 in FIG. 3 is not fast. The present invention minimizes the amount of traffic that has to go over the bus 13. The vertex cache 15 holds a certain number of vertices (e.g., 16 entries of the vertex buffer 8). The texture cache 16 stores images that are textured or mapped onto the mesh geometry.

In accordance with the present invention, the vertex cache 15 is checked to see if it contains the needed vertices. If so, a face is formed. If not, it retrieves the needed vertex from the vertex buffer 8.

Each face of the mesh is specified by three vertex indices. An ordering of the faces of the mesh corresponds substantially exactly with a sequence of indexed triangle strips on the mesh. Each indexed triangle strip can also be specified as a sequence of vertex indices.

The indexed triangle strip is an application programming interface (API) for the application to efficiently specify triangle faces to the graphics processor 14. For each face in the indexed triangle strip, the graphics processor knows the face's three vertex indices. Thus, for each face, and for each of the three vertex indices, the graphics processor gathers the vertex data. It does this by first querying the vertex cache 15. If the vertex data is not in the cache 15, it is then fetched from the buffer 8 in memory 7 (which is much slower).

As described above, bus traffic between the graphics subsystem and memory can become a bottleneck when rendering geometrically complex meshes. During strip-growing of faces, the vertex cache is checked to see if it contains the vertex data for the face being formed. If so, the face is formed using the cached data, thus avoiding the need to access the system memory. If the vertex cache does not contain the needed vertex data (this is known as a "miss"), the desired information is retrieved from the vertex buffer in the system memory. The rendering of a single triangle face by the graphics processor can result in 0, 1, 2, or 3 vertex cache misses. Misses decrease the system performance. Accordingly, it is desirable to minimize the number of cache misses. Moreover, conventional systems do not constrain the length of the strips of faces; therefore, the strips could overflow the capacity of the cache, thereby preventing the re-use of vertices between successive strips.

Thus, the present invention improves locality of vertex references through an API for meshes. A vertex cache in the graphics processor transparently buffers data for recently referenced vertices. During a preprocess, the faces of a mesh are reordered to maximize references to vertices in the cache.

Exemplary Operating Environment

Figure 4:
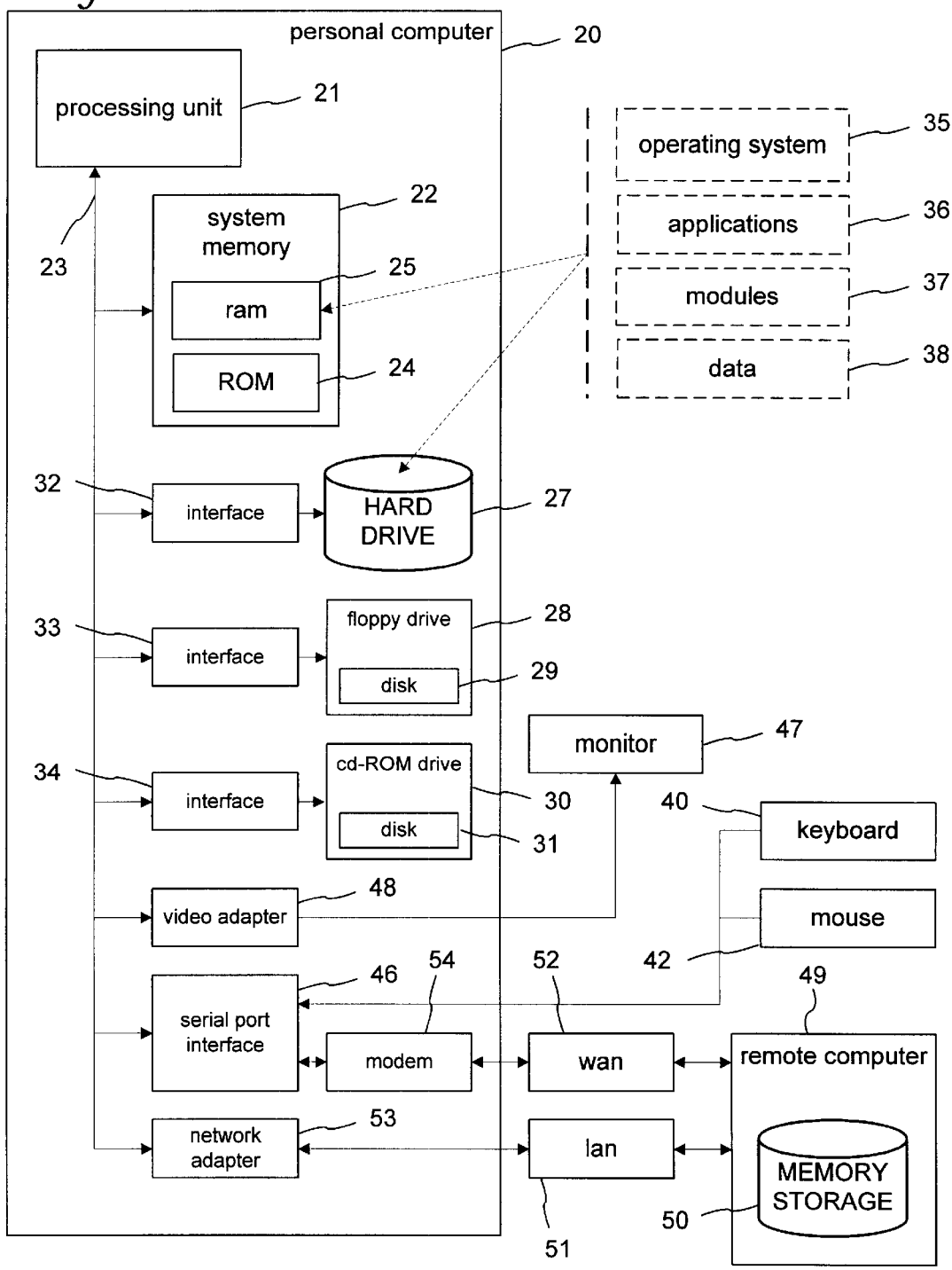
FIG. 4 is a block diagram of a computer system that can be used to implement a method and apparatus embodying the invention.

FIG. 4 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 4, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multiprocessor architectures also can be used as the processing unit 21.

The system bus may be any of several types of bus structure including a memory bus or memory controller, a peripheral bus, and a local bus using any of a variety of conventional bus architectures. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 4. The logical connections depicted in FIG. 4 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the. wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Strip-Growing

The transparent vertex caching framework of the present invention uses the indexed triangle strip memory organization described above with respect to FIG. 2(d). In order to maximize the performance of the transparent vertex caching architecture, it is desirable to find a sequence of indexed triangle strips of a mesh that minimizes the amount of data transferred over the bus (i.e., minimizes the cache miss rates). The sequence of triangle strips is defined by a permutation F of the original sequence of faces $\hat{F}$. Thus, the general optimization problem (i.e., the bandwidth problem) is $$\min_{F \in P(\hat{F})} C'(F)$$

where $P(\hat{F})$ denotes all m! permutations of the faces, and the cost $$C'(F) = m(r(F) \cdot 32 + b(F) \cdot 2) \quad (1)$$

corresponds to the number of bytes transferred over the bus. The hardware model is that, for each face, the graphics processor requests three vertices from the cache, in the order shown in FIG. 2(f). r(F) is the miss rate and b(F) is the bloat factor that arises from having to send duplicate indices. It is desirable to minimize the miss rate.

The present invention uses a strip-growing technique to minimize the miss rate. A triangle strip is incrementally grown, and at each step it is determined whether it is better to add the next face to the strip or to restart the strip. This binary decision is made by performing a set of look-ahead simulations of the vertex-cache behavior. Pseudocode for the method is shown and described below with respect to FIG. 5. An exemplary output of the strip-growing method is shown in FIG. 8(b).

function reorder( )
  Sequence<Face>F={ }; // new face sequence Face f=0;
  loop
    if (!f) //restart process at some location on the mesh
      f=some unvisited face with few unvisited neighbors( ); // the starting face is a face with few unvisited neighbors
      if (!f) break; // all faces are visited Queue<Face>Q;
      // possible locations for strip restarts loop // form
      a strip (then check to determine if the strip is too long for the vertex cache)
        if (strip too long( ) // using look-ahead simulation
          f=Q.next unvisited face( ); // may be 0
          break; // force a strip restart f.mark visited( ) //
          mark the faces as visited F.add to end(f); // add
          the face to the sequence off // Get counter-clockwise and clockwise faces continuing strip
          (fccw,fclw)=f.next two adjacent unvisited faces( ); // determine the two next unvisited faces
        if (fccw) // continue strip counter-clockwise (test to determine if the next two unvisited faces are available)
          if (fclw) Q.push(fclw); f=fccw;
        else if (fclw) // continue strip clockwise f=fclw;
        else // cannot continue strip f=Q.next unvisited face( ); // may be 0
          break; // force a strip restart
    return F;

The method begins by marking all faces of the mesh as unvisited at step 200. A starting face is selected at step 205 to be the face with the fewest number of neighbors. From this face, a strip is begun. It should be noted that if the length of each strip is not constrained, the strips could overflow the capacity of the cache, thereby preventing re-use of vertices between successive strips. Therefore, before adding each face, a look-ahead simulation of the cache is performed at step 210 to determine if the strip should be forced to restart at step 215. This method adapts strip lengths to the cache capacity to reorder the faces. In other words, the strip-growing method performs look-ahead simulations of the rendering process to determine an ordering of the faces in memory, for the purpose of maximizing the use of the cache.

The look-ahead simulation at step 210 determines the cost of restarting the strip at a new location and determines if any face has a lower cost than the cost of restarting. If it is determined that a face has a lower cost than the cost of restarting, then the face is formed. If no face has a lower cost than the cost of restarting, the strip is restarted at a new location.

More specifically, the look-ahead simulation at step 210 performs a set of s simulations {0 . . . s−1} of the strip-growing process over the next s faces to determine whether the current triangle strip is to be restarted, or whether it is to continue to the next face. Simulation number $i \in \{0 \ldots s-1\}$ forces the strip to restart after exactly i faces, and computes an associated cost value C(i) equal to the average number of cache misses per visited face. If among these simulations, the lowest cost value corresponds to restarting the strip immediately, i.e., $\forall i \in \{1 \ldots s-1\}$ C(0)<C(i), the strip is forced to restart. Through experimentation, the inventor has determined that s=k+5 is a desirable choice for a face restart queue. Preferably, the face restart queue is a FIFO structure. The face restart queue acts as a queue to store future starting places, which are used if the two next unvisited faces are unavailable.

Note that the local cost function C approximates only the first term of the true bandwidth cost C' of Equation 1. Although C fails to account for vertex index traffic, the strip-growing technique implicitly attempts to minimize the number of strips, because restarts are only allowed when the strict inequalities of the above cost condition are satisfied. Within each strip, the method cannot afford to leave isolated faces behind, so it has little choice over the direction of strip formation.

As an optimization, instead of computing all s cost values before visiting each face, the method first computes C(0) and then stops as soon as it finds another C(i)≦C(0). Also, the first cost value computed after C(0) is $C(i_{min})$ where $i_{min}$ was the simulation returning the lowest cost value for the previously visited face. With this optimization, the number of look-ahead simulations per face is reduced. In other words, as one optimization technique, the first face found in the look-ahead simulation that has a cost lower than the restart cost is formed. In this manner, all of the possible faces do not always have to be determined in the look-ahead simulation.

The look-ahead simulation grows strips similar to the main strip growing method. A difference is that it takes a single parameter s≧0 and forces a triangle strip restart after s faces are visited. Thus, the look-ahead simulation with s=0 immediately forces a strip restart (even if the current strip could be continued, that is, if there is a neighboring unvisited face). The look-ahead simulation with s=1 will add one more face to the current strip (again, this added face is completely determined—there is no choice) and then force a strip restart (even if the current strip could be continued). If among all these look-ahead simulations, the one that returns the lowest cost is s=0, then the strip is restarted. If not, the strip is continued. This technique minimizes the number of vertices that are retrieved from the vertex buffer, and maximizes the number of needed vertices that are obtained from the vertex cache. To further insure that the maximum number of vertices are obtained from the vertex cache, a FIFO cache replacement policy is used.

If the look-ahead simulations determine that the strip should be restarted, at step 215, processing continues at step 225 with a determination of whether there are unvisited faces in the face restart queue that contains possible locations for strip restarts. If there are unvisited faces in the queue, then a new strip is restarted at the first unvisited face in the queue, at step 230, the unvisited face is removed from the queue, and processing continues at step 210. If there are no unvisited faces in the queue, then a strip is restarted at a new location in the mesh, at step 250. In selecting the new location, one criterion is to favor unvisited faces with vertices already in the cache, and another criterion is to select a face with the fewest number of unvisited neighbors. Processing continues at step 205.

If the look-ahead simulations determine that the strip should not be restarted, at step 215, then the next face is determined to be a neighboring face of the current face. Processing continues at step 220 with a determination of the number of neighboring unvisited faces of the current face. The current face has three neighboring faces; one of these is the face just previously visited by the triangle strip. Of the remaining two neighboring faces, there may be 0, 1, or 2 unvisited faces.

If there are no neighboring unvisited faces, the strip cannot continue and therefore a new strip is restarted. Processing continues at step 225 as described above.

If there is one neighboring unvisited face, the strip continues with the neighboring unvisited face at step 235, and processing continues at step 210.

If there are two neighboring unvisited faces, one of the neighboring faces is selected to continue the strip at step 240, and the other face is pushed onto the queue of possible locations for strip restarts at step 245. Preferably, if there are two neighboring unvisited faces, the strip continues with the face that will continue the strip in a counter-clockwise direction, although other methods of selecting the face to continue with can be used. Processing continues at step 210.

A FIFO cache is preferred because when a FIFO cache reaches steady state, vertices between strips s−1 and s are dropped from the cache at precisely the right time, i.e., before any vertices that are to be used for strip s+1. Although a FIFO cache is preferred, a vertex cache with a least-recently-used (LRU) replacement policy can also be used, although an LRU cache cannot support strips as long as a FIFO cache. The reason is that vertices shared between a strip s−1 and the next strip s are referenced during the traversal of s, and thus "pushed to the front" of the LRU cache, even though they are no longer used in the subsequent strip s+1. On a regular mesh, the inventor has determined that the optimal strip length is about k−2 faces for an LRU cache and about 2k−4 faces for a FIFO cache. Therefore, the FIFO cache is preferable.

Local Optimization

Another exemplary technique in accordance with the present invention is a local optimization technique that is used after the above-described strip-growing technique has been completed. Using a set of ordering perturbations, local optimization attempts to improve the initial sequence of faces F produced by the strip-growing method.

Preferably, faces are shuffled to try to determine if the cost can be further improved. FIG. 6(a) shows an initial order and FIGS. 6(b)–6(d) show three types of perturbations, each parameterized by two indices $1 \leq x,y \leq m$ into the face sequence F. FIG. 6(b) shows subsequence reflection in which two faces are flipped or swapped (i.e., Reflect$_{x,y}$ reverses the subsequence $F_{x \ldots y}$). It should be noted that the subsequence reflection affects a whole sequence of faces. The subsequence is specified by a beginning face and an ending face. FIG. 6(c) shows insertion of one face in which one face is moved from the back to the front (i.e., Insert1$_{x,y}$ moves face $F_y$ before face $F_x$). FIG. 6(d) shows a pair of faces are moved from the back to the front (i.e., Insert2$_{x,y}$ moves a pair of faces $F_{y-1}$ and $F_y$ before face $F_x$).

These three types of perturbation were chosen because they use only two parameters and yet have enough freedom to find many reordering improvements. $P^t_{x,y}$ denotes a perturbation of type t.

For each candidate perturbation P:F→F', the resulting change in cost $\Delta C(P)=C(F')-C(F)$ is determined and the perturbation is applied if $\Delta C(P)<0$. The primary cost function is $C(F)=32 \cdot cm_k(F)+6\#strips(F)$, where $cm_k$ denotes the total number of cache misses for a cache of size k, and #strips is the number of triangle strips induced by the face sequence F. This cost function is an approximation of the true cost function C" from Equation 1 in that it does not measure the number of duplicated vertices used to override the default direction for strip formation. This difference does not significantly affect results.

The selection of candidate perturbations $P^t_{x,y}$ is now described. It should be recalled that each candidate perturbation is parameterized by two face indices x and y. To determine the index x, all the faces are visited in a random order. For each visited face f, its index x in the current ordering is determined, i.e., $F_x=f$. Having selected x, a set Y of indices of possible parameters y is formed. Y could be set to the exhaustive set $\{1 \ldots m\}$, but that would be wasteful because most faces $F_y$ would be nowhere near $F_x$ and thus unlikely to contribute to an improvement. Therefore, Y is set to contain the indices of faces either vertex-adjacent to $F_x$ in the mesh or adjacent to $F_x$ in the current ordering (i.e., $F_{x-1}$ and $F_{x+1}$).

Figure 7:
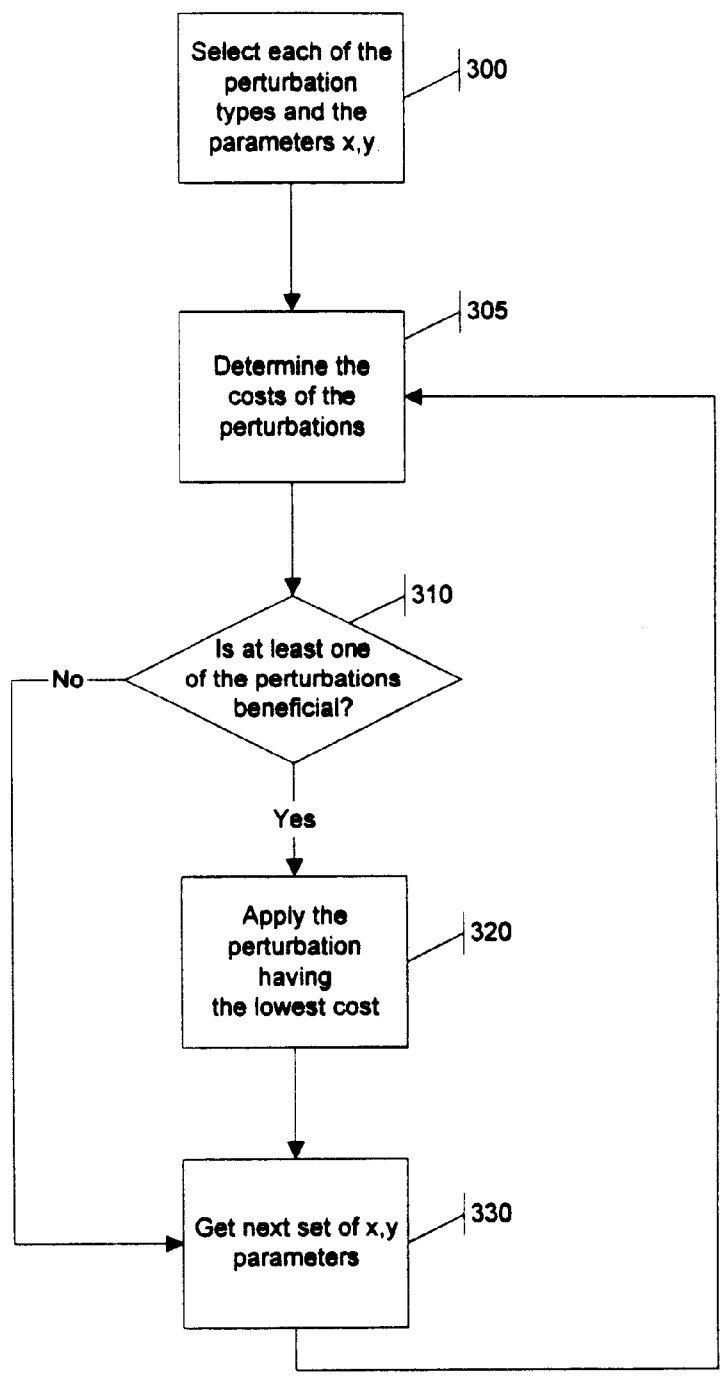
FIG. 7 is a flow chart of an exemplary local optimization method in accordance with the present invention.

FIG. 7 is a flow chart of an exemplary local optimization method in accordance with the present invention. At step 300, each of the perturbation types is selected along with the x and y parameters. At step 305, the costs of the perturbations are determined. More specifically, for each y∈Y, all three types of perturbation are determined to find the one with the lowest cost:

$$\min_{y,t} C(P^t_{x,y}(F))$$

It is determined at step 310 if at least one of the perturbations will be beneficial. If $\Delta C(P^t_{x,y}) \geq 0$, it is determined that a beneficial operation cannot be found, and therefore the method proceeds to the next x. Otherwise, $P^t_{x,y}$ is beneficial and could be applied at this point. Thus, if at least one of the perturbations will be beneficial, then the perturbation having the lowest cost is applied at step 320. The next set of x and y parameters is retrieved at step 330, and processing continues at step 305. If it is determined at step 310 that at least one of the perturbations will not be beneficial, then no perturbation is applied, and processing continues at step 330 with the retrieval of the next set of x and y parameters. The user determines when to terminate the local optimization. For example, the process is repeated for a user specified number of times.

Optionally, before applying the perturbation $P^t_{x,y}$ having the lowest cost at step 320, it can be determined if a locally better perturbation can be found. Specifically, keeping the index y, the other index $$z = \underset{z' \in Z}{\arg\min} \min_t C(P^t_{y,z'}(F))$$

is determined with the best perturbation from y, where the set Z is formed like Y. If z=x then it is determined that a locally optimal perturbation is available, and it is applied. Otherwise, x←y and y←z are replaced and iterations continue until convergence.

Fast Re-evaluation of the Cost

For reasonable performance, it is desirable that $\Delta C(P^t_{x,y})$ be computed quickly. In particular, the computation time should be independent of the interval length |x-y|. First consider just the two perturbations $Insert1_{x,y}$ and $Insert2_{x,y}$. One key observation is that the cache behavior for the sequences F and F' is likely to be different only near the interval endpoints x and y, and in particular just after x and just after y. If x and y are sufficiently far apart, the cache is likely to resynchronize within the interior of the interval. This feature is used as described below.

For each face $F_i$, a set $b_i$ of three bits reflecting the current cache miss states of its three vertex references is stored. Given the perturbation $P^t_{x,y}$:F←F', the expected cache state is loaded just prior to location x. This is achieved by moving backwards through F from x until k misses have been detected in the stored bits $b_i$, and then proceeding forwards again while loading the cache with those misses.

The cache from x forwards through F' is then simulated, recording changes in cache misses from those stored in the $b_i$. When k successive cache misses are detected without any intervening cache miss changes between F and F', the cache state is known to be resynchronized, and thus no additional changes will occur until y is reached. Note that the number of faces visited before the caches resynchronize is generally independent of the interval size |x-y|.

Because the displacement of faces $F_y$ and $F_{y-1}$ may have changed the cache state at y, any cache miss changes in the sequence beginning at y+1 are determined. This is done as described above for x.

As a result of this process, the change in the number of cache misses between sequences F and F' is determined. The other element desired to compute $\Delta C(P)$ is to determine the induced change in the number of triangle strips. For this, the face adjacencies at the slice points in FIG. 7 are considered.

The $Reflect_{x,y}$ perturbation is more difficult to handle because the entire interval $F_{x \ldots y}$ is reversed. For fast evaluation of its change in cost, at each face $F_i$ another three bits $b^R_i$ are stored that correspond to the cache miss states when traversing the faces of F in reverse order, and are used when simulating $F_{y \ldots x} \subset F'$.

Results

Figure 8A:
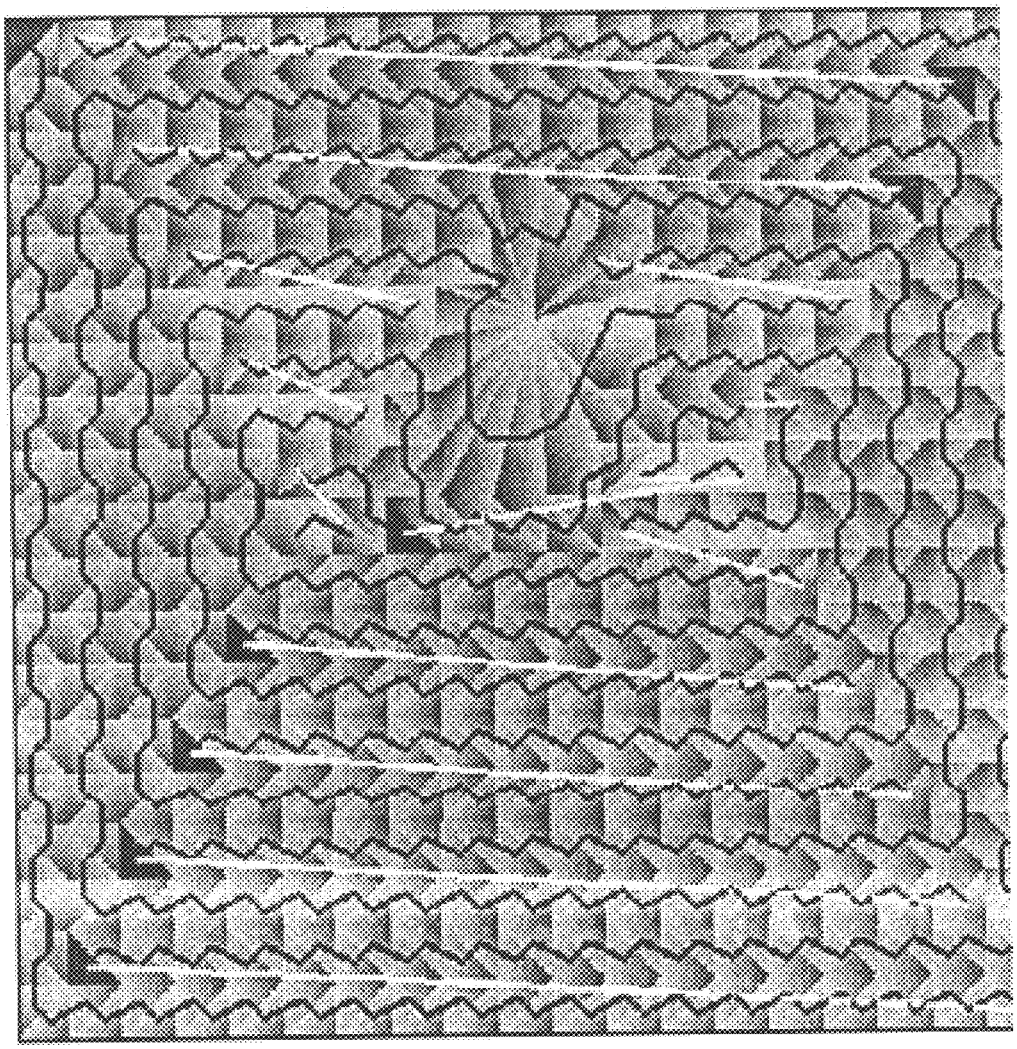
FIGS. 8(a)–8(c) are views of exemplary meshes face orderings (8(a) is a mesh resulting from triangle strip ordering, 8(b) is a mesh resulting from strip-growing in accordance with the present invention, and 8(c) is a mesh resulting from local optimization in accordance with the present invention).
Figure 8B:
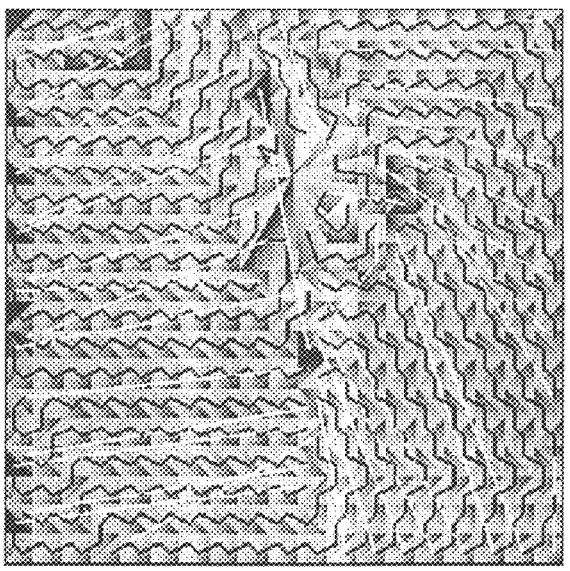
Figure 8C:
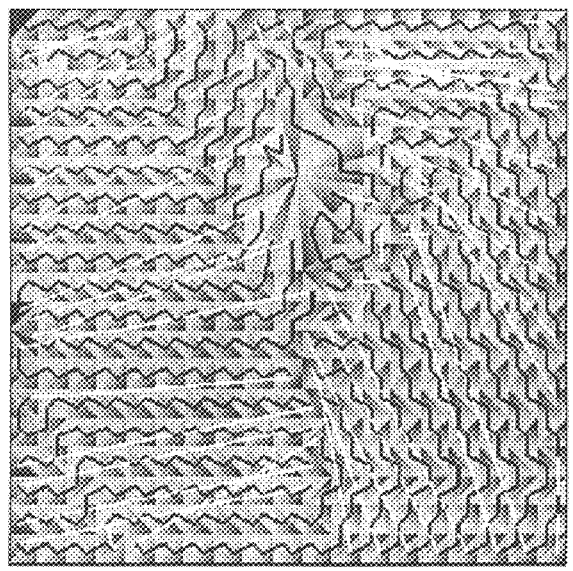

FIGS. 8(a)–8(c) show a comparison of the face orderings resulting from a traditional stripification algorithm (8(a)), the strip-growing technique of the present invention (8(b)), and the local optimization technique of the present invention (8(c)). Indicated results are the average number r of cache misses per triangle, the strip bloat factor b, and the overall bandwidth cost C' in bytes per triangle.

Figure 1B:
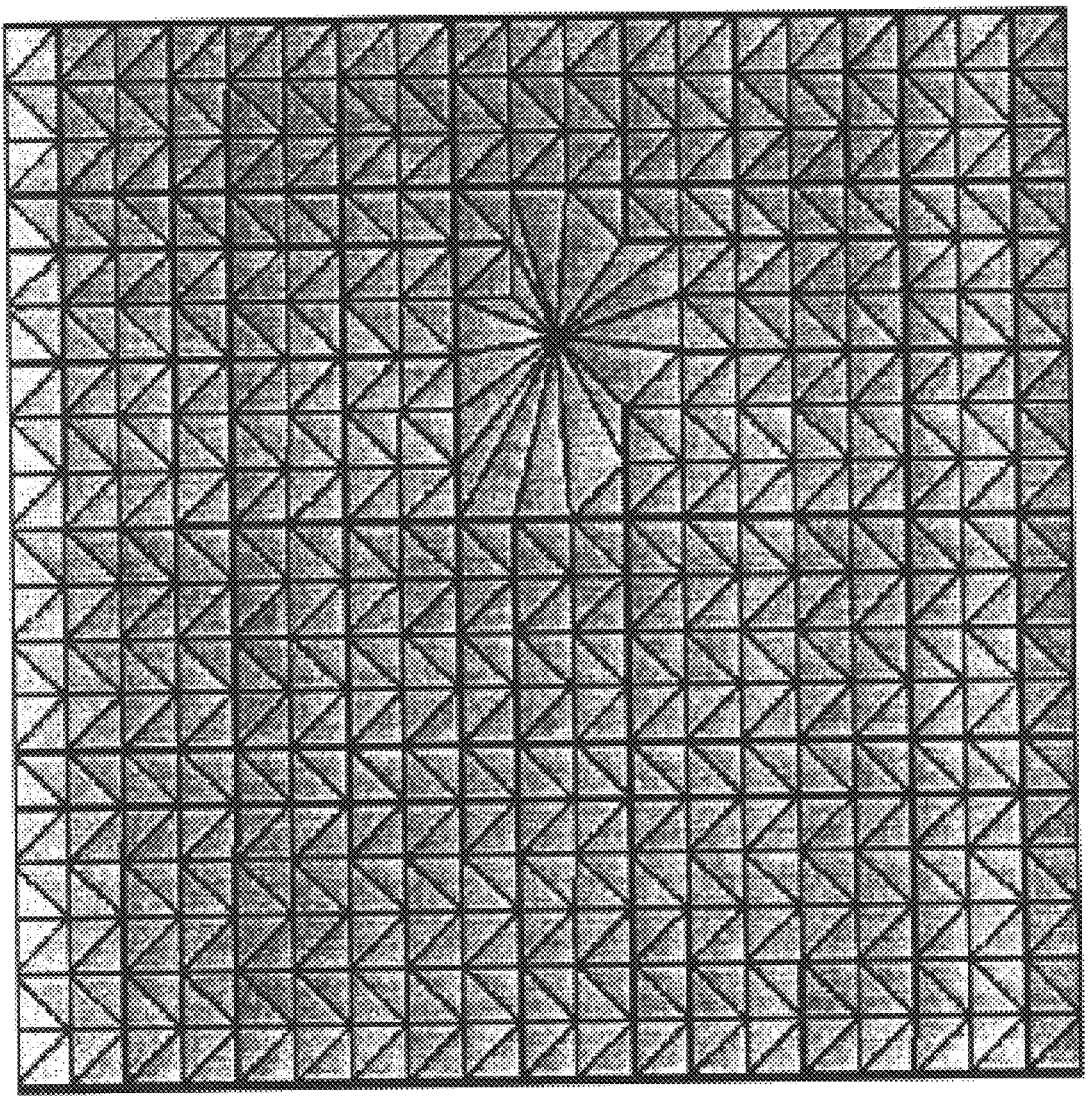
FIG. 1(b) is a view of an exemplary mesh of triangle faces sharing a common set of vertices.

In other words, FIGS. 8(a)–8(c) show the costs for three different orderings of the faces in a simple mesh (i.e., the original mesh shown in FIG. 1(b)). The ordering is illustrated using the black line segments (for adjacent faces within a strip) and white line segments (for strip restarts). Within each face, the level of shading at the three corners indicate if the vertex was present in the cache. As shown in FIG. 8(a), stripification algorithms (such as the triangle strips shown, and described with respect to FIG. 2(b)) may produce strips that are too long, resulting in a cache miss rate of r≈1.0, observed visually as one dark corner per triangle. In contrast, the reordering techniques of the present invention (strip-growing in FIG. 8(b) and strip-growing plus local optimization in FIG. 8(c)) come closer to the optimal r=0.5, i.e., one cache miss every other triangle.

In FIGS. 8(b) and 8(c), because r≈0.6, and b≈1.5, the cache miss traffic (r·32) is generally much more significant than the vertex index traffic (b·2). Both face reordering techniques of the present invention make some simplifying approximations with respect to this less significant term.

The columns labeled "Greedy" in Table 2 show results of the strip-growing method described above with respect to additional data sets A and B tested by the inventor. The execution rate of the method on all of these models ranges from 35,000 to 43,000 faces per second on 450 MHz Pentium 2 system. Thus, even the most complex mesh is processed in less than six seconds.

TABLE 2

Cache miss rates using the strip-growing method and the local optimization method (expressed as both miss/triangle and miss/vertex), and overall transfer bandwidth using a traditional stripification method versus transparent vertex caching.

| Data Set | # vertices n | # faces m | r Greedy | r Optimi. | Miss/ Vertex Greedy | miss/ vertex Optimi. | Triangle strips | Vertex caching Greedy | Vertex caching Optim. |
|---|---|---|---|---|---|---|---|---|---|
| A | 1015 | 1999 | 0.70 | 0.66 | 1.38 | 1.30 | 45.0 | 25.5 | 24.4 |
| B | 49,794 | 100,000 | 0.70 | 0.65 | 1.40 | 1.30 | 45.8 | 25.5 | 24.2 |

Results of the local optimization method described above are presented in the columns labeled "Optimi." in Table 2. The results show that local optimization is generally able to reduce cache misses by between about three and six percent.

Also, it should be noted that the cache miss rate has an absolute lower bound of one miss per vertex since each vertex is loaded at least once into the cache. For most meshes, this lower bound is in fact higher because the maximum lengths of strips is bounded by the cache size, and non-boundary vertices on the ends of strips are loaded in the cache more than once. For an infinitely large regular triangulation, the number of misses per vertex therefore has a lower bound of 1+(1/(k−1)).

The execution times for the local optimization method range from about 5 minutes to about 4 hours on these meshes. The method finds improvements at a high rate initially, then gets diminishing returns, so it could be stopped earlier. Although the optimization scheme is several orders of magnitude slower than the strip-growing technique, it is effective at further reducing vertex-cache miss rates by several percent.

The rightmost section of Table 2 compares the total bandwidth used for a traditional triangle strip representation and for the transparent vertex caching framework. It demonstrates that bandwidth is reduced by between approximately 40 and 46 percent.

In the local optimization scheme, further gains might be attainable using more complex reordering perturbations that exploit the strip structure present in the face ordering. Also, execution time could be reduced using more pruning heuristics.

Other Improvements

Because the cost function C is rather flat and the perturbations do not look very far, the cost function is preferably smoothed by adding a secondary cost function, $C''(F)=0.003\ cm_{k-1}(F)+0.002\ cm_{k+1}(F)$, that examines the number of cache misses for caches with one less entry ($cm_{k-1}(F)$), and with one more entry ($cm_{k-1}(F)$). The motivation for this function is that it attempts to maximize unused space in the cache whenever possible.

It is unlikely that a perturbation will be beneficial if its endpoint x lies in the middle of a strip and the surrounding faces have good caching behavior. Therefore, the heuristic of pruning the search from x is used if (1) the face $F_x$ is neither at the beginning nor at the end of a strip and (2) the sum of cache misses on the three faces $\{F_{x-1}, F_x, F_{x+1}\}$ is less than 3.

If the mesh is rendered in a sprite-based rendering architecture, one should be careful not to modify the order of faces across image layers. Usually, this simply involves restricting the reordering to take place independently within each connected component of the mesh.

Modifying the order in which faces are rendered may also alter the final image if faces are co-incident, if the Z-buffer is disabled, or if the triangles are partially transparent. This limitation is shared by all schemes that modify the face ordering, including ordinary triangle strip generation.

With the transparent vertex caching framework, vertex data can be compressed by the CPU independently of mesh connectivity. In particular, time-dependent geometry presents a significant opportunity for vertex data compression. As an example, Lengyel, *Compression Of Time-Dependent Geometry*, Symposium on Interactive 3D Graphics (1999), ACM, describes a scheme that clusters vertices together and predicts their positions by associating to each cluster a local coordinate frame that deforms over time; the resulting residuals are compressed separately. In effect, Lengyel's scheme reorders vertices to improve geometric coherence, and does not care about the order of faces. On the other hand, the present invention reorders faces to improve graphics coherence, and does not care about the order of vertices. This demonstrates how vertex data compression could interact with the techniques of the present invention.

A large percentage of vertices are loaded into the cache only once, i.e., the first and only time they cause a cache miss. In some system architectures, it may be useful to reorder the vertices in the mesh to match the order in which they are first requested, so that the memory access pattern is mostly sequential. The trade-off is that reordering the vertices causes some loss of transparency, because the application may need to be aware that the mesh vertices have been permuted. Unlike in a general CPU computation, the memory access pattern from the graphics processor can be predicted by buffering the vertex index stream (which is entirely sequential), so memory latency becomes less important than overall memory bandwidth. Several graphics systems already perform similar buffering when pre-fetching texture memory as triangle fragments make their way to the rasterizer.

Conclusions

The transparent vertex caching framework of the present invention uses the indexed triangle strip memory organization described above with respect to FIG. 2(d). Thus, the memory size is still approximately (16+2b)m bytes. However, the transfer bandwidth is reduced through the introduction of a vertex cache of size k (e.g., element 15 in FIG. 3). Vertex caching reduces the transfer size to $m·b·2+m·r·32=(r·32+b·2)m$ bytes, where r denotes the average cache miss rate, in misses per triangle. Since each vertex is loaded into the cache at least once and m≦2n, the miss rate r has a lower bound of 0.5. The cache replacement policy is chosen to be FIFO.

The present invention provides transparent vertex caching in which (1) the graphics system reads a stream of indices addressing a common array of vertices, so vertex data is not duplicated; (2) vertex data is in native uncompressed format; (3) because the API is a traditional mesh interface, applications can experience speedup without modification, and rendering is still efficient on legacy hardware; (4) geometry can be dynamic, because the application can freely modify the vertex array at video rates; and (5) vertex caching is transparent and follows a strict FIFO policy.

Thus, the present invention uses a vertex cache to transparently reduce the geometry bandwidth between the graphics processor and memory in the context of a traditional mesh rendering API. Maximizing the efficiency of the cache involves reordering the faces in the mesh during a preprocessing step.

The present invention offers several practical benefits over Deering and Chow. Because the vertex data is stored in native floating-point format, it can be efficiently modified from frame to frame by the application to create dynamic models. For instance, animated skinned meshes represent a significant portion of geometric bandwidth in some recent computer games. Moreover, an existing application program requires no modification because it continues to use the same API. All that is necessary is to preprocess its geometric models to appropriately reorder the mesh faces. Finally, the present invention provides backward compatibility because these preprocessed models still render efficiently using the same API on legacy hardware optimized for triangle strips.

The face reordering problem is cast as a discrete optimization problem with an explicit cost function corresponding to bus traffic. To approach this problem, a strip-growing method is presented for reordering the faces in a mesh to improve locality. This approach differs from Chow in that it explicitly simulates the behavior of the vertex cache through a look-ahead procedure. The cache miss rates resulting from this method are comparable to those reported by Chow, despite the fact that the mesh interface lacks explicit cache management (e.g., "push bits").

Although the above description is directed to triangle meshes, it is contemplated that the meshes can be any polygonal shape, and that strips in accordance with the present invention could be defined on the non-triangle faces.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

We claim:

1. A process for creating a data structure comprising a mesh representation of a three-dimensional (3D) object in a computer graphics system, wherein the mesh representation comprises vertices defining faces, and wherein the system includes a vertex cache of a predetermined size and a memory which is operatively coupled to the vertex cache via a bus, comprising:

providing vertex data, representing vertices of the faces of the mesh, and storing the vertex data in a vertex buffer portion of the memory; and using the vertex data and a predefined process to determine an ordering of the faces of the mesh so as to minimize a cache miss rate during rendering of the object.

2. A process as recited in claim 1, wherein the predefined process comprises:

starting a strip-growing procedure in which a plurality of faces of the mesh are organized into a strip, wherein a cost function is associated with the addition of each new face to the strip;

at each current face, deciding whether to add a new face to the strip or instead to restart the strip-growing procedure, by determining the cost of restarting the strip-growing procedure at a face that is not adjacent to a current face;

performing a look-ahead simulation to determine the cost of continuing the strip at a face that is adjacent to the current face; and restarting the strip-growing procedure if the cost of restarting is lower than the cost of continuing at an adjacent face.

3. A process as recited in claim 2, wherein, if the strip-growing procedure is to be restarted, the process first checks to determine whether any unvisited faces have been pushed onto a queue, and if so the procedure is restarted at the first unvisited face in the queue, and if not the procedure is restarted at an unvisited face having a fewest number of unvisited neighbors.

4. A process as recited in claim 2, wherein, if the strip-growing procedure is not to be restarted, a determination is made of which adjacent face to add to the strip by (a) determining the number of adjacent unvisited faces, (b) if the number of adjacent unvisited faces is one, then adding the one adjacent unvisited face to the strip, and (c) if the number of adjacent unvisited faces is two, then adding the adjacent face that is in a predetermined direction from the current face, and pushing the other adjacent unvisited face onto a queue.

5. A process as recited in claim 4, wherein, if the strip-growing procedure is not to be restarted, but the number of adjacent unvisited faces is zero, then the strip-growing procedure is restarted.

6. A process as recited in claim 1, further comprising:

providing at least one ordering perturbation process, wherein a cost function is associated with each ordering perturbation process;

determining a cost of each perturbation process;

comparing the cost of each perturbation process to a predetermined value to determine whether each perturbation process is beneficial; and if at least one of the perturbation processes is beneficial, performing the perturbation process having the lowest cost to the ordering of the faces of the mesh so as to generate a re-ordering of the faces of the mesh to minimize a cache miss rate during rendering of the object.

7. A data structure stored in a computer readable memory created by the process recited in claim 1.

8. A data structure stored in a computer readable memory, for use in a computer graphics system including a vertex cache of a predetermined size and a memory operatively coupled to the vertex cache via a bus, comprising a mesh representation of a three-dimensional (3D) object, wherein the mesh representation comprises vertices defining faces, wherein the vertex data is stored in a vertex buffer portion of the memory, and wherein the faces of the mesh are arranged in the memory so as to minimize a cache miss rate during rendering of the object.

9. A computer graphics system for creating a data structure comprising a mesh representation of a three-dimensional (3D) object, wherein the mesh representation comprises vertices defining faces, comprising:

a vertex cache of a predetermined size;

a memory operatively coupled to the vertex cache via a bus, the memory having a vertex buffer portion for storing vertex data representing vertices of the faces of the mesh; and a processor for using the vertex data and a predefined process to determine an ordering of the faces of the mesh so as to minimize a cache miss rate during rendering of the object.

10. A system as recited in claim 9, wherein the processor (a) starts a strip-growing procedure in which a plurality of faces of the mesh are organized into a strip, wherein a cost function is associated with the addition of each new face to the strip; (b) at each current face, decides whether to add a new face to the strip or instead to restart the strip-growing procedure, by determining the cost of restarting the strip-growing procedure at a face that is not adjacent to a current face; (c) performs a look-ahead simulation to determine the cost of continuing the strip at a face that is adjacent to the current face; and (d) restarts the strip-growing procedure if the cost of restarting is lower than the cost of continuing at an adjacent face.

11. A system as recited in claim 10, further comprising a queue for storing unvisited faces, wherein, if the strip-growing procedure is to be restarted, the processor first checks to determine whether any unvisited faces have been pushed onto the queue, and if so the procedure is restarted at the first unvisited face in the queue, and if not the procedure is restarted at an unvisited face having a fewest number of unvisited neighbors.

12. A system as recited in claim 10, further comprising a queue for storing unvisited faces, wherein, if the strip-growing procedure is not to be restarted, the processor determines which adjacent face to add to the strip by (a) determining the number of adjacent unvisited faces, (b) if the number of adjacent unvisited faces is one, then adding the one adjacent unvisited face to the strip, and (c) if the number of adjacent unvisited faces is two, then adding the adjacent face that is in a predetermined direction from the current face, and pushing the other adjacent unvisited face onto the queue.

13. A system as recited in claim 12, wherein, if the strip-growing procedure is not to be restarted, but the number of adjacent unvisited faces is zero, then the processor restarts the strip-growing procedure..

14. A process for creating a data structure comprising a mesh representation of a three-dimensional (3D) object in a computer graphics system, wherein the mesh representation comprises an ordering of faces, comprising:

provide at least one ordering perturbation process, wherein a cost function is associated with each ordering perturbation process;

determining a cost of each perturbation process;

comparing the cost of each perturbation process to a predetermined value to determine whether each perturbation process is beneficial; and if at least one of the perturbation processes is beneficial, performing the perturbation process having the lowest cost to the ordering of the faces of the mesh so as to generate a re-ordering of the faces of the mesh to minimize a cache miss rate during rendering of the object.

15. A process as recited in claim 14, wherein each ordering perturbation process is one of face subsequence reflection, face insertion, and paired face insertion.

16. A process as recited in claim 14, wherein determining the cost of each perturbation process comprises parameterizing each perturbation process by two faces of the mesh.

17. A process as recited in claim 16, wherein the two faces are adjacent in the mesh or adjacent in the ordering of faces.

18. A process as recited in claim 16, further comprising repeating the process a user specified number of times.

19. A data structure stored in a computer readable memory created by the process recited in claim 14.

20. A computer graphics system for creating a mesh representation of a three-dimensional (3D) object in a computer graphics system, wherein the mesh representation comprises an ordering of faces, comprising:

a data store for storing data representative of the ordering of faces; and a processor for generating a re-ordering of the faces of the mesh to minimize a cache miss rate during rendering of the object.

21. A system as recited in claim 20, wherein the processor (a) determines a cost of at least one ordering perturbation process, each ordering perturbation process having an associated cost function; (b) compares the cost of each perturbation process to a predetermined value to determine whether each perturbation process is beneficial; and (c) if at least one of the perturbation processes is beneficial, performs the perturbation process having the lowest cost to the ordering of the faces of the mesh so as to generate a re-ordering of the faces of the mesh to minimize a cache miss rate during rendering of the object.

22. A system as recited in claim 21, wherein each ordering perturbation process is one of face subsequence reflection, face insertion, and paired face insertion.

23. A system as recited in claim 21, wherein the processor determines the cost of each perturbation process by parameterizing each perturbation process by two faces of the mesh.

24. A system as recited in claim 23, wherein the two faces are adjacent in the mesh or adjacent in the ordering of faces.

25. A system as recited in claim 23, wherein the processor repeats the process a user specified number of times.

* * * * *

UNITED STATES PATENT AND TRADEMARK OFFICE
CERTIFICATE OF CORRECTION

PATENT NO.     : 6,426,747 B1
DATED          : July 30, 2002
INVENTOR(S)    : Hugues Hoppe and John W. Miller It is certified that error appears in the above-identified patent and that said Letters Patent is hereby corrected as shown below:

Column 9,
Line 58, please delete the word "off" and insert therefore -- $off$ --.

Column 10,
Line 53, please delete the symbol "$\leqq$" and insert therefor -- $\leq$ --.
Line 64, please delete the symbol "$\geqq$" and insert therefor -- $\geq$ --.

Column 12,
Line 8, please delete "$1\leqq x.y \leqq m$" and insert therefor -- $1 \leq x.y \leq m$ --.

Column 13,
Line 34, please delete the symbol "←" and insert therefor -- → --.

Column 15,
In between lines 39 and 40, please insert the following heading -- Issues in modifying rendering order --.

Column 16,
Line 24, please delete the symbol "$\leqq$" and insert therefor -- $\leq$ --.

Signed and Sealed this

Twenty-eighth Day of January, 2003

JAMES E. ROGAN
*Director of the United States Patent and Trademark Office*